US008959086B2

(12) United States Patent  
Bastide et al.

(10) Patent No.: US 8,959,086 B2  
(45) Date of Patent: Feb. 17, 2015

(54) AUTOMATED ONLINE SOCIAL NETWORK INTER-ENTITY RELATIONSHIP MANAGEMENT

(75) Inventors: Paul R. Bastide, Boxford, MA (US); Matthew E. Broomhall, South Burlington, VT (US); Robert E. Loredo, N. Miami Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/538,294

(22) Filed: Jun. 29, 2012

(65) Prior Publication Data

US 2014/0006400 A1 Jan. 2, 2014

(51) Int. Cl.  
*G06F 17/30* (2006.01)

(52) U.S. Cl.  
USPC ............ 707/728; 707/732; 707/734; 707/769

(58) Field of Classification Search  
CPC .................................................. G06F 17/30604  
USPC .................................. 707/728, 769, 732, 734  
See application file for complete search history.

(56) References Cited

U.S. PATENT DOCUMENTS

| | | | | |
|---|---|---|---|---|
| 7,822,631 | B1 * | 10/2010 | Vander Mey et al. | 705/7.29 |
| 8,019,743 | B2 * | 9/2011 | Ebanks | 707/706 |
| 8,306,922 | B1 * | 11/2012 | Kunal et al. | 705/319 |
| 8,386,564 | B2 * | 2/2013 | Pennington | 709/204 |
| 8,612,891 | B2 * | 12/2013 | Singh et al. | 715/833 |
| 8,615,552 | B2 * | 12/2013 | Shah | 709/205 |
| 2007/0214141 | A1 * | 9/2007 | Sittig et al. | 707/7 |
| 2008/0134053 | A1 * | 6/2008 | Fischer | 715/747 |
| 2009/0319288 | A1 * | 12/2009 | Slaney et al. | 705/1 |
| 2010/0064040 | A1 * | 3/2010 | Wise et al. | 709/224 |
| 2010/0076966 | A1 * | 3/2010 | Strutton et al. | 707/728 |
| 2010/0228614 | A1 * | 9/2010 | Zhang et al. | 705/14.16 |
| 2010/0241580 | A1 * | 9/2010 | Schleier-Smith | 705/319 |
| 2011/0153740 | A1 | 6/2011 | Smith et al. | |
| 2011/0246907 | A1 | 10/2011 | Wang et al. | |
| 2011/0296004 | A1 | 12/2011 | Swahar | |
| 2012/0016875 | A1 * | 1/2012 | Jin et al. | 707/734 |
| 2012/0124085 | A1 * | 5/2012 | Baber et al. | 707/769 |
| 2012/0124483 | A1 * | 5/2012 | Zuckerberg et al. | 715/752 |
| 2012/0130819 | A1 * | 5/2012 | Willcock et al. | 705/14.66 |
| 2012/0143972 | A1 * | 6/2012 | Malik et al. | 709/206 |
| 2012/0209832 | A1 * | 8/2012 | Neystadt et al. | 707/723 |
| 2012/0271885 | A1 * | 10/2012 | Hoffman | 709/204 |
| 2012/0297313 | A1 * | 11/2012 | Sharma | 715/751 |
| 2013/0018879 | A1 * | 1/2013 | McConnell et al. | 707/728 |
| 2013/0346404 | A1 * | 12/2013 | Bennett et al. | 707/732 |

* cited by examiner

*Primary Examiner* — Noosha Arjomandi  
(74) *Attorney, Agent, or Firm* — Scully, Scott, Murphy & Presser, P.C.

(57) ABSTRACT

A system and method of managing online social networking which includes identifying a plurality of users related to a primary user on a social networking tool using a computer. The method and system identifies a plurality of activities performed by the plurality of users on the social networking tool, and assigning a score to each of the activities. A threshold cumulative score for users to enter a group is defined. The system and method evaluates the activities of each of the users, and calculates a cumulative score for each of the users based on their respective activities, and evaluates the cumulative score of each of users in relation to the group. One or more of the plurality of users who meet the threshold cumulative score are assigned to the group. A status for each user in the group based on their cumulative score is determined.

16 Claims, 2 Drawing Sheets

AUTOMATED ONLINE SOCIAL NETWORK INTER-ENTITY RELATIONSHIP MANAGEMENT

FIELD

The present disclosure relates to a method and system for managing an online social network, and more particularly relates to managing relationships or interrelations between users on the online social network.

BACKGROUND

Social networks may be established using a computer network (e.g., the Internet) wherein users login to a website having a social networking tool (i.e., software) established on one or more servers (e.g., web servers). Known online social networks include creating a profile and accepting or declining connections with other users. Online social networks represent a group, a set of relationships, or a community of people joined for a common reason or purpose, typically from social contact outside the online social network. The social network may dynamically grow or shrink based on many conditions which effect membership in the network.

Typical online social networks are cumbersome to maintain, for example, to reduce the amount of users in the social network, or to increase the amount of users in the social network. In one example, known online social networks are lacking in providing a method of pruning or shrinking a social network.

BRIEF SUMMARY

According to an aspect of the disclosure, a method of managing online social networking includes: identifying a plurality of users related to a primary user on a social networking tool using a computer having a processor; identifying a plurality of activities performed by the plurality of users on the social networking tool; assigning a score to each of the activities; defining a threshold cumulative score for users to enter a group; evaluating the activities of each of the users, and calculating a cumulative score for each of the users based on their respective activities; evaluating the cumulative score of each of users in relation to the group; assigning one or more of the plurality of users who meet the threshold cumulative score to the group; and determining a status for each user in the group based on their cumulative score.

According to another aspect of the disclosure a system for managing online social networking includes a processor for identifying a plurality of users related to a primary user on a social networking tool, and identifying a plurality of activities performed by the plurality of users on the social networking tool. The processor assigns a score to each of the activities, and defines a threshold cumulative score for users to enter a group or to remain part of a group. A computer readable storage medium stores social networking data including the activities of the users. The computer readable storage medium communicates with the processor for evaluating the activities of each of the users, and calculating a cumulative score for each of the users based on their respective activities. The processor evaluates the cumulative score of each of users in relation to the group, assigns one or more of the plurality of users who meet the threshold cumulative score to the group, and determines a status for each user in the group based on their cumulative score.

In another aspect according to the disclosure, a computer readable storage medium stores a program of instructions executable by a machine to perform a method of managing online social networking, which includes: identifying a plurality of users related to a primary user on a social networking tool using a computer having a processor; identifying a plurality of activities performed by the plurality of users on the social networking tool; assigning a score to each of the activities; defining a threshold cumulative score for users to enter a group; evaluating the activities of each of the users, and calculating a cumulative score for each of the users based on their respective activities; evaluating the cumulative score of each of users in relation to the group; assigning one or more of the plurality of users who meet the threshold cumulative score to the group; and determining a status for each user in the group based on their cumulative score.

Further features as well as the structure and operation of various embodiments are described in detail below with reference to the accompanying drawings. In the drawings, like reference numbers indicate identical or functionally similar elements.

DETAILED DESCRIPTION

In one aspect of the present disclosure, online social networking may be improved, for example, by managing the online social network, for instance, managing the members of a group both quantitatively and qualitatively.

Figure 1:
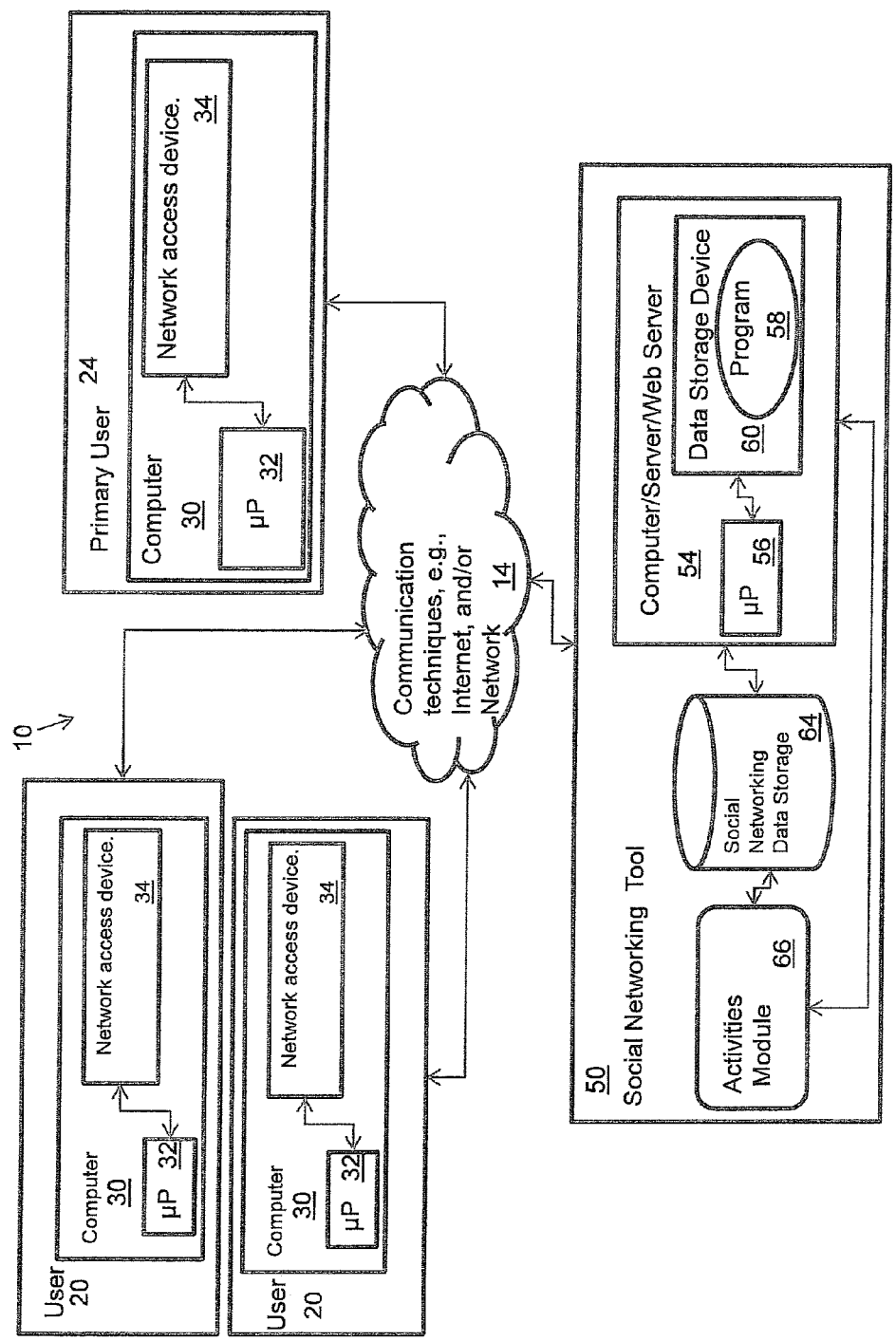
FIG. 1 is a schematic diagram illustrating an overview of the methodology of the present disclosure in an embodiment.
Figure 2:
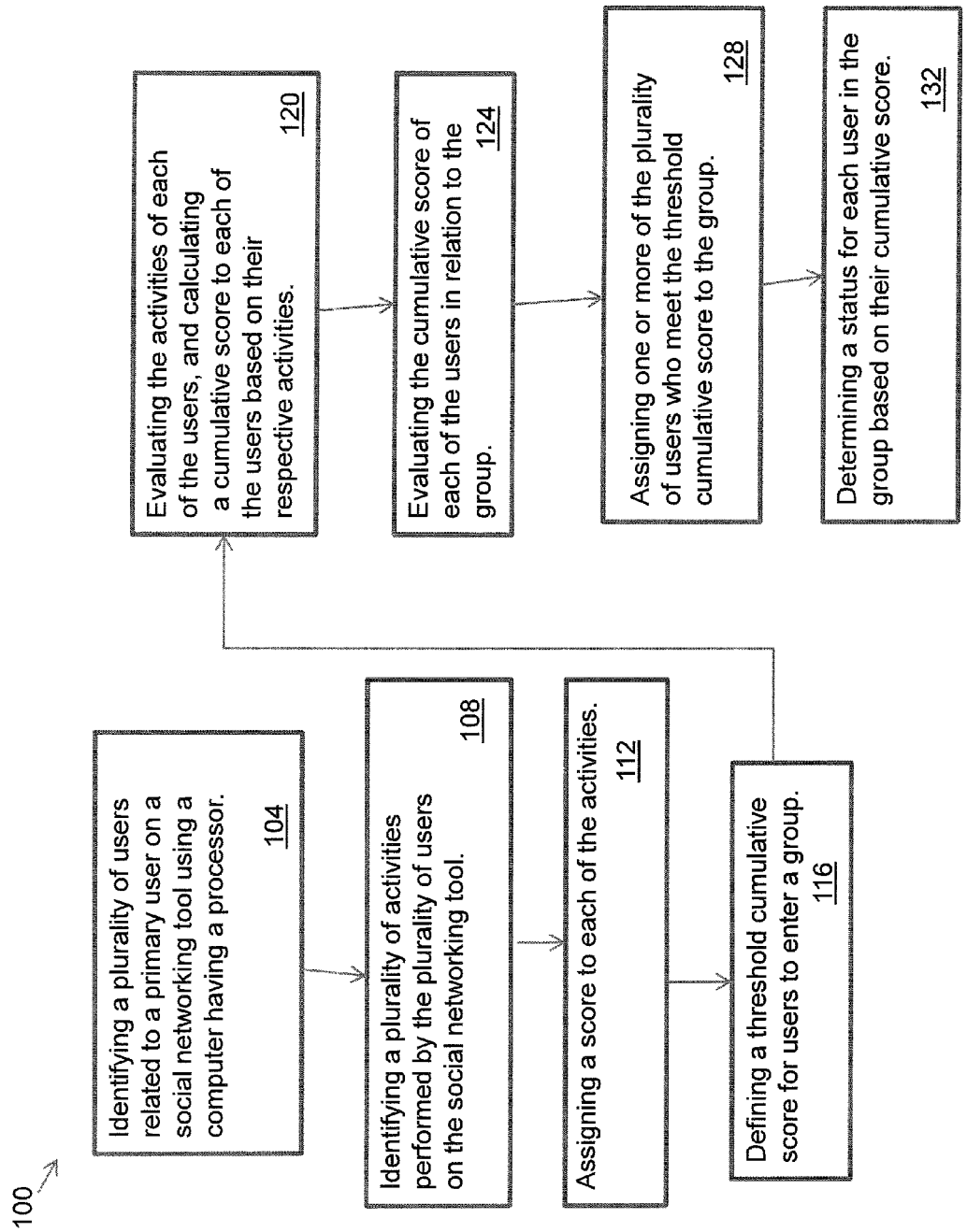
FIG. 2 is a flow diagram illustrating a method for online social networking management according to one embodiment of the present disclosure.

Referring to FIGS. 1 and 2, a system 10 and method 100 is depicted for managing online social networking according to the disclosure in one embodiment. The method 100 includes identifying a plurality of users 20 related to a primary user 24 on a social networking tool 50 using a computer 30 having a processor 32, in step 104. The computer 30 may access a network 14, e.g., the Internet, to enter and navigate the social networking tool 50 on a website using a network access device 34. In the embodiment of the invention shown in FIG. 1, two users 20 are shown for illustrative purpose, however, any number of users can be connected and/or have a profile or other type of account on the social networking tool 50. The users 20 and the primary user 24 may have profiles on the social networking tool 50, including, logins, preferences, and personal data. The social networking tool 50 may be accessible from a plurality of computers, e.g., using a shared network, and in one embodiment is accessible using the Internet or other methods collectively designated as communication techniques 14 in FIG. 1. The social networking tool 50 may be hosted on a webserver computer 54 or multiple computers, and include a microprocessor 56 for executing a program 58 embodied on a computer readable medium or a computer readable storage device 60. The program 58 may execute the steps of the method 100. Social networking data, such as user profiles, photos, messaging, or other data relating to activities between users, may be stored in a database 64.

Step 108 includes identifying a plurality of activities identified by activities module 66 based on using the social networking tool 50. The activities may include a user posting a photo, accessing a group profile or a user's profile, posting a comment on a user's profile or a group profile, and sending a message to one or more users 20 in the group or to the primary user 24. In one example, the activities each include social interaction with the primary user, e.g., via a common group, or direct social interaction such as an exchange of emails or text messages.

Step 112 includes assigning a score to each of the activities. The score may include a point system for each activity. Further, the score or point system may be scaled based on contact with the primary user 24. The activities may include: a comment, a message; or sharing a photograph. The score or points assigned to each activity may be set by default, or customized by the primary user, or set by an administrator such as an administrator of the social networking tool.

Step 116 includes defining a threshold cumulative score for users to enter a group. The threshold cumulative score is a sum of the scores from the activities of each user 20 which allows entry to a group. The threshold cumulative score may be defined by the primary user 24, or the threshold cumulative score may be assigned by the computer 54. The primary user 24 may define a group. The group may include a community of users having a common purpose or activity, users who socially interact with the primary user, or users who have a specified relationship to each other or the primary user within the social networking tool. For example, a specified relationship may include users in the same family, or users who are work colleagues. Additional relationships may include well established social relationships such as clubs, industry groups, hierarchical relationships (employee to manager), group membership, elected officials. Generally, these can be thought of as established Circles or groups in the physical and online realms.

Step 120 includes evaluating the activities of each of the users 20, and calculating a cumulative score for each of the users based on their respective activities in relation to the group. The cumulative score is the sum of the scores from the activities of each user in relation to the group.

Step 124 includes evaluating the cumulative score of each of users in relating to the group. For example, comparing the cumulative score to the threshold score required for a user to enter a group.

Step 128 includes assigning one or more of the plurality of users who meet the threshold cumulative score to the group. Step 132 includes determining a status for each user in the group based on their cumulative score. In one example, a user 20 may be removed from a group when the user's cumulative score falls below the threshold cumulative score. Further, the status for each user can be used to define a status level for the user in relation to the group. The status level may include: a primary, a secondary, and a probationary status. In one example, the primary status relates to a highest score of the cumulative scores; the probationary status relates to a lowest score of the cumulative scores; and the secondary status relates to a middle score of the cumulative scores between the highest and lowest cumulative scores. A degree of relationship between users may be represented as a score or quantitative number, a slider, or another user interface which represents the score.

Thereby, an automated or manual association of online social entities (group, community, network or profile), may be managed by the method of the present disclosure. The method 100 may automatically administer the degree of relationship between the entities, which may be determined by a quantitative value calculated from the shared resources of the entities, as described in the embodiments above. Thereby, the relationship between persons or users in the on line social entity, may reflect the timeline of the social entity.

In an exemplary embodiment in accordance with the present disclosure, employing the method 100 and system 10 described above for managing online social networking may include a first user or primary user, and second and third users all being members of an online social network. The primary user configures a community in the social network, defining a minimum quantitative value of, for example, five. The primary user may upload a resource to the community with the second and third users associated (e.g., linked, friends, or otherwise associated) to the primary user, wherein the resource may be, for example, a photograph. The second and third users are added to the community based on the activity. In this example, both the second and third users comment on a thread in the community. The method 100 may add one point for the activity to the cumulative score for the second and third users. The method 100 may trigger another evaluation of the community members, and in this example, places the second and third users in a new member status in the community.

In another exemplary embodiment in accordance with the present disclosure, which employs the method 100 and system 10 described above for managing online social networking, a first user or primary user, and second and third users are all members of an online social network. The primary user may configure a profile on the social networking tool 50 with a threshold cumulative score of three for joining a group related to the profile. For instance, if the second user messages the primary user, the method 100 updates the second user's cumulative score with a score (also referred to as quantitative value) of 1 for the activity. If the third user messages the primary user, the method 100 updates the third user's cumulative score with a score (or quantitative value) of 1. If a fourth user uploads a photo with the primary, second and third users, the method 100 may update the second and third user's cumulative score by a score (or quantitative value) of 3 for this activity. The method may then evaluate the users' relationship to the primary user, and establishes a group of the primary user, and the second and third users. In the group, the second and third users are assigned a status in the group, such as secondary status, for example, of primary, secondary, and probationary statuses, based on their relationship to the primary user. In one example, after one month, the primary user changes the threshold cumulative score to five, after which, the third user messages the primary user, receiving a score for this activity of 1. The period of time for re-evaluating group status may be varied by the primary user, and may include re-evaluation at set time periods, or on demand, or upon one or more activities. The method 100 re-evaluates the activities related to the relationships and re-assigns the second user to a probationary status based on their relationship with the primary user, that is, their cumulative score, and the third user is re-assigned to a primary status, based on the relationship with the primary user, that is, the third user's cumulative score. For example, in another re-evaluation, the second user may be removed or dropped from the group based on not meeting the threshold cumulative score. Alternatively, a time period may be related to the threshold cumulative score, such that a user may be removed from a group when the user's cumulative score drops below a threshold cumulative score for a period of time.

FIG. 1 illustrates a schematic of an example social networking system including representative users, and a computer system or processing system (shown in FIG. 1) that may implement the method 100 (shown in FIG. 2) in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with one or more processing systems in the present disclosure may include, but are not limited to, personal computer systems, server computer systems, handheld or laptop devices, multiprocessor systems, microprocessor-based systems, programmable consumer electronics, network PCs, minicomputer systems, mainframe computer systems, cell phones, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units, a system memory, and a bus that couples various system components including system memory to processor. Computer system may include a variety of computer system readable media. Such media may be any available media that is accessible by computer system, and it may include both volatile and non-volatile media, removable and non-removable media. System memory 58, shown in FIG. 1, can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices such as a keyboard, a pointing device, a display, etc.; one or more devices that enable a user to interact with computer system; and/or any devices (e.g., network card, modem, etc.) that enable computer system to communicate with one or more other computing devices. Such communication can occur via input/output (I/O) interfaces. Additionally, computer systems can communicate with one or more networks such as a local area network (LAN), a general wide area network (WAN), and/or a public network (e.g., the Internet) via network adapter. As depicted, network adapter communicates with the other components of computer system via bus. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages, a scripting language such as Perl, Visual Basic Script (VBS) or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present disclosure is limited to these particular embodiments. Thus, various changes and modifications may be effected by one skilled in the art without departing from the spirit or scope of the disclosure as defined in the appended claims.

We claim:

1. A method of managing online social networking, comprising:

identifying a plurality of users related to a primary user on a social networking tool using a computer having a processor;

identifying a plurality of activities performed by the plurality of users on the social networking tool;

assigning a score to each of the activities, the score customized by the primary user;

defining a threshold cumulative score for entry into a group comprising: specified users having a specified relationship to each other within the social networking tool, and a community of users having a common purpose;

evaluating the activities of each of the users, and calculating a cumulative score for each of the users based on their respective activities;

evaluating the cumulative score of each of the users in relation to the group; assigning one or more of the users who meet the threshold cumulative score to the group; and determining a status for each user assigned to the group based on their cumulative score, wherein at least the steps of defining a threshold, evaluating the activities, and evaluating the cumulative score are repeated, and wherein responsive to detecting a drop below the threshold cumulative score of one of the plurality of users for a period of time, removing said one of the plurality of users from the group, and wherein the specified relationship reflects a timeline of the group;

wherein the status for each user defines a status level for the user in relation to the group wherein the status level includes: primary, secondary, and probationary status; and wherein the primary status relates to a highest score of the cumulative scores, the probationary status relates to a lowest score of the cumulative scores, and the secondary status relates to a middle score of the cumulative scores between the highest and lowest cumulative scores.

2. The method of claim 1, wherein the threshold cumulative score is defined by the primary user.

3. The method of claim 1, further comprising:
assigning users to a group automatically using the computer.

4. The method of claim 1, wherein the activities include communication between users using the social networking tool.

5. The method of claim 1, wherein the group is defined by the primary user.

6. The method of claim 1, further comprising:
removing a user when the user's cumulative score is below the threshold cumulative score.

7. The method of claim 1, wherein the activities include posting a photo; accessing a group profile or a user's profile; posting a comment on the user's profile or the group profile; and sending a message to a user.

8. The method of claim 1, wherein each of the users in the group have a profile in the social networking tool.

9. The method of claim 1, wherein each of the activities of the plurality of activities include interaction with the primary user.

10. A system for managing online social networking, comprising:
a processor for identifying a plurality of users related to a primary user on a social networking tool, and identifying a plurality of activities performed by the plurality of users on the social networking tool, the processor assigning a score to each of the activities, the score customized by the primary user, and defining a threshold cumulative score for entry into a group comprising: specified users having a specified relationship to each other within the social networking tool, and a community of users having a common purpose;
a non-transitory computer readable storage medium for storing social networking data including the activities of the users, the computer readable storage medium communicating with the processor for evaluating the activities of each of the users, and calculating a cumulative score for each of the users based on their respective activities, the processor evaluating the cumulative score of each of the users in relation to the group, assigning one or more of the users who meet the threshold cumulative score to the group, and determining a status for each user assigned to the group based on their cumulative score,
wherein at least the defining a threshold, the evaluating the activities, the calculating a cumulative score and the evaluating the cumulative score are repeated, and wherein responsive to detecting a drop below the threshold cumulative score of one of the plurality of users for a period of time, removing said one of the plurality of users from the group, and wherein the specified relationship reflects a timeline of the group;
wherein the status for each user defines a status level for the user in relation to the group wherein the status level includes: primary, secondary, and probationary status; and wherein the primary status relates to a highest score of the cumulative scores, the probationary status relates to a lowest score of the cumulative scores, and the secondary status relates to a middle score of the cumulative scores between the highest and lowest cumulative scores.

11. The system of claim 10, wherein the activities include posting a photo; accessing a group profile or a user's profile; posting a comment on the user's profile or the group profile; and sending a message to a user.

12. A non-transitory computer readable storage medium storing a program of instructions executable by a machine to perform a method of managing online social networking comprising:
identifying a plurality of users related to a primary user on a social networking tool using a computer having a processor;
identifying a plurality of activities performed by the plurality of users on the social networking tool;
assigning a score to each of the activities, the score customized by the primary user;
defining a threshold cumulative score for entry into a group comprising: specified users having a specified relationship to each other within the social networking tool, and a community of users having a common purpose;
evaluating the activities of each of the users, and calculating a cumulative score for each of the users based on their respective activities;
evaluating the cumulative score of each of the users in relation to the group; assigning one or more of the users who meet the threshold cumulative score to the group; and
determining a status for each user assigned to the group based on their cumulative score,
wherein at least the steps of defining a threshold, evaluating the activities, and evaluating the cumulative score are repeated, and wherein responsive to detecting a drop below the threshold cumulative score of one of the plurality of users for a period of time, removing said one of the plurality of users from the group, and wherein the specified relationship reflects a timeline of the group;
wherein the status for each user defines a status level for the user in relation to the group wherein the status level includes: primary, secondary, and probationary status; and
wherein the primary status relates to a highest score of the cumulative scores, the probationary status relates to a lowest score of the cumulative scores, and the secondary status relates to a middle score of the cumulative scores between the highest and lowest cumulative scores.

13. The computer readable storage medium of claim 12, further comprising:
assigning users to a group automatically using the computer.

14. The computer readable storage medium of claim 12, wherein the activities include communication between users using the social networking tool.

15. The computer readable storage medium of claim 12, further comprising:
removing a user when the user's cumulative score is below the threshold cumulative score.

16. The computer readable storage medium of claim 12, wherein the status for each user defines a status level for the user in relation to the group.

* * * * *